L. J. ROBERTS.
Milk-Coolers.
No. 158,603. Patented Jan. 12, 1875.
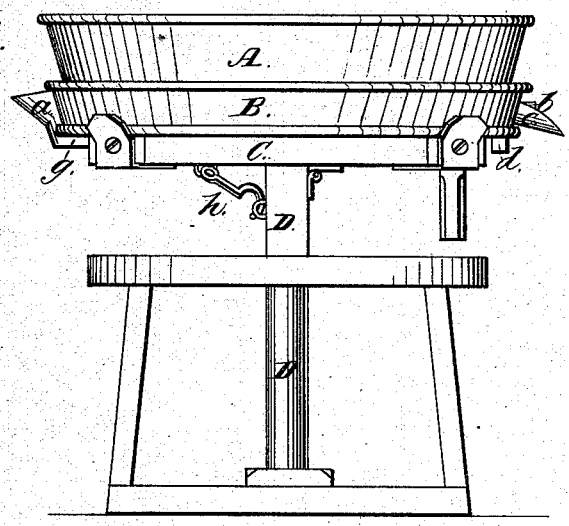
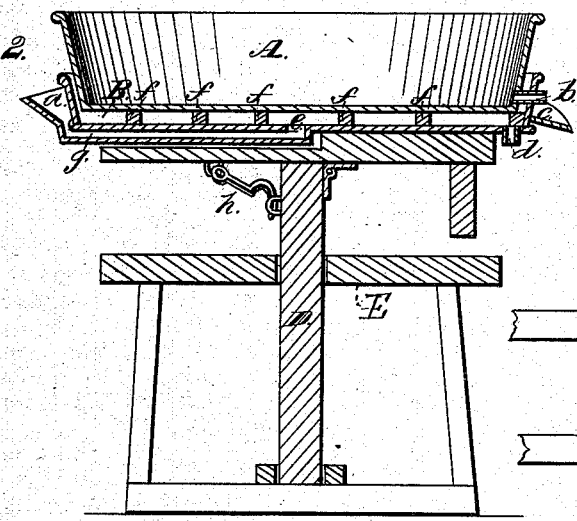
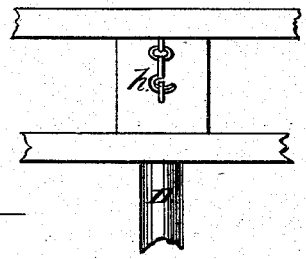
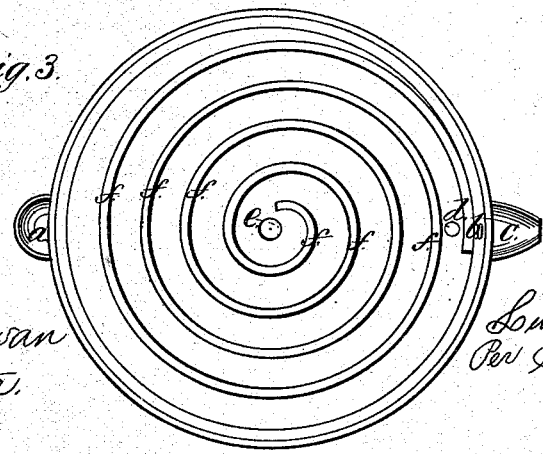
Attest:
John Gavesan
M. M. Cutter
Inventor:
Luke J. Roberts
Per S. J. Deavitt
Atty.

UNITED STATES PATENT OFFICE.

LUKE J. ROBERTS, OF WATERBURY, VERMONT.

IMPROVEMENT IN MILK-COOLERS.

Specification forming part of Letters Patent No. 158,603, dated January 12, 1875; application filed April 14, 1874.

*To all whom it may concern:*

Be it known that I, LUKE J. ROBERTS, of Waterbury, in the county of Washington and State of Vermont, have invented new and useful Improvements in Dairy Implements, known as Milk-Cooling Pans, of which the following is a specification:

My invention consists in an improved pan, simple in construction and convenient in use, for setting large quantities of milk, with the temperature of the milk regulated for producing the largest possible amount of cream by water contained within, and flowing through, a space formed between the exterior of the milk-pan and the interior of the water pan.

The following is a description thereof:

In the accompanying drawings, which illustrate my invention, and form a part of this specification—

Figure 1 is a perspective view. Fig. 2 is a sectional view of pans, table, and standards. Fig. 3 is a plan view of the water-pan. Fig. 4 represents the method of connecting the table to the standard.

Each of my milk-coolers is composed of two pans, A and B, one placed within the other, which may be of any desired size, the inside pan, A, being half an inch, more or less, smaller on every part of the diameter than the outside one, B. The outside one may be very shallow, if desired. $g$ is a pipe on the outside pan, that conveys the water from hopper $a$ under the bottom of the pan to inlet $e$ at the center, as seen in Fig. 2. C represents the table, upon which the pans rest, and in which is a groove sufficiently deep to contain pipe $g$. The table C is attached to the rotary standard D by hinge and hook, as shown in Fig. 4, whereby the table can be turned as far as one pleases, and easily tipped to one side for the purpose of emptying either pan of its contents. When properly constructed, it may be turned without disturbing or ruffling the milk or impeding the rise of cream. It turns without tipping, and tips without turning, as desired, and is supported as shown in drawings. In the bottom of the pan B is a strip of rubber encircling the bottom several times, and being of the width of the space between pans A and B, upon which pan A rests. The pressure of pan A upon the rubber $fff$ makes a close joint of the rubber, causing the water which enters pan B at the center, at $c$, to flow around between the pans A and B several times before reaching the outlet $c$, the rubber being held in place as shown in Fig. 3. The outlet $c$, as shown in Figs. 1 and 2, may be at the bottom or in the side of pan B, at any height desired. It may also be provided with an outlet, as shown by $d$, and is only used when all the water is to be taken from the pan. Pan A may be emptied of its contents, when desired, through a smaller tube passing through and extending beyond the outlet $c$, which is closed by the use of a proper plug or its equivalent. This tube leading from pan A may pass or extend over the top of pan B, if desired, as the pans A and B can be easily tipped to any desired degree by loosening hook $k$ on standard D, as seen in Fig. 4. Rotary standard D may be constructed with a table or stool of any convenient size.

I am well aware that a milk-cooler composed of two pans or compartments—one for the milk and the other for water—is not new; and I do not broadly claim it. Neither do I claim, broadly, the channeling of water; but What I do claim as new, and desire to secure by Letters Patent, is—

1. The combination and arrangement of the separable pans A and B with table C and standard D, and a suitable support, E, whereby the whole device may be horizontally revolved, substantially as and for the purposes set forth.

2. The rotary table C, attached to standard D by the hinge and hook, substantially as and for the purposes set forth.

LUKE J. ROBERTS.

Witnesses:
T. J. DEAVITT,
JOHN GAVEGAN.